Patented Sept. 7, 1937

2,092,163

UNITED STATES PATENT OFFICE 2,092,163

ALKALINE SILICA GEL

Edward S. Johnson, Wellesley, Mass., assignor to The Calco Chemical Company, Inc., Bound Brook, N. J., a corporation of Delaware No Drawing. Application August 26, 1933, Serial No. 687,010

6 Claims. (Cl. 23—182)

This invention relates to a new type of silica gel and methods of preparing the same.

In the past silica gels of satisfactory hardness and porosity have been prepared in an acid medium. It was thought that an acid medium was a prerequisite to obtaining satisfactory gels since attempts to make silica gel in an alkaline or substantially neutral medium resulted in the formation of curds or flocks and it was impossible to form a real alkaline gel.

According to the present invention, I have found that when certain precautions are taken silica gels can be prepared in a medium alkaline or substantially neutral to Congo, and these gels show porosity and resistance to disintegration superior to those prepared in an acid medium. Thus, for example, when silica gels of the ordinary commercial variety are dried and dropped into water they disintegrate; whereas the alkaline gels of the present invention do not disintegrate and at most show some cracking of larger fragments. The peculiar elasticity of the new alkaline gels appears to be due to some molecular arrangement as of course the chemical composition of the gel is substantially the same as that of an acid gel.

In order to produce alkaline silica gels, two main precautions must be adopted. First, the temperature must be kept low, preferably around 0° C., and secondly, the potassium or sodium silicate solution used as a raw material must be diluted, as the use of full strength silicate solutions results in the production of commercially useless curds or flocks. The temperature range which can be used is somewhat narrow and extends from the temperature at which the silicate tends to crystallize before reaction up to temperatures somewhat above 0° C. While temperatures around 0° C. give the best results, somewhat higher temperatures may be used, but the character of the gel changes gradually as the temperature of formation is increased, and the desirable characteristics of the gel are diminished. There is no sharp temperature dividing line above which the gel does not form. On the contrary this zone is a somewhat indeterminate one. At 10° C. no useful gel is obtained, but as the temperature is gradually reduced down toward 0° C., gels begin to form and as the temperature gets lower the quality of the gel improves until at about 0° C. gels of high porosity and resistance to water are readily obtained. Still lower temperatures give satisfactory gels, but if the temperature drops too low, especially with gels made from sodium silicate there is a tendency for the sodium silicate to crystallize before reaction with the acid, and this, of course, gives unsatisfactory gels. In general, it is not necessary to go below 0° C. as no notable improvement in gel quality is observed at lower temperatures and the gelling time increases without any corresponding benefit.

The dilution required corresponds substantially to 7 parts of water to 5 parts of potassium silicate solution of the usual commercial strength of about 30–33° Bé. In the case of sodium silicate the corresponding dilution is substantially 12 parts of water to 5 parts of sodium silicate solution. Gels will form from more concentrated solutions and also from less concentrated solutions but care must be taken not to permit the solution to become too concentrated, particularly if the temperature is slightly above 0° C., if curdiness is not to result. Similarly at low temperatures it is difficult to obtain gels after the dilution is greatly increased and the gelling time becomes too long to be a satisfactory commercial process. However, the invention is not limited to the precise dilutions which give the best results at 0° C., it being understood that a considerable range on either side will give useful gels and is included.

The acidity should be such that at no time is there any condition of acidity to Congo. This requires, of course, the addition of the acid to the silicate solution, and in general it should be added sufficiently slowly so as to prevent local formation of acid zones. Of course the speed of addition will depend on the efficiency of stirring. With vigorous stirring a more rapid addition of acid can be employed. Various acids may be used but as sulfuric acid gives satisfactory results and is the cheapest commercial acid, its use is preferred. It should be understood, however, that the other commercial acids such as hydrochloric acid, may be substituted if desired. The acid should be carefully calculated so that the silicate solution is neutralized to Congo or is slightly alkaline. In general, it is desirable to calculate out the amount of acid as it is difficult to measure the acidity in the forming gel during reaction and there is danger of not stopping the addition of acid at the right point unless the amount has been precalculated. Various acid strengths may be used, but in general, with the dilution given, 13% sulfuric acid is most satisfactory. Of course the amount of dilution of the silicate will vary somewhat with the strength of the acid, a more dilute acid permitting the use of a more concentrated silicate solution. Best results are, however, obtained when sulfuric acid of about 13% is employed.

After the gel has been formed, it should be washed free from sulfates, particularly if it is to be used as a catalyst carrier for which it shows extraordinary activity. Thus vanadium catalysts on alkaline silica gel show very much better conversion efficiency than corresponding catalysts on acid silica gel. If the gel is to be used as a catalyst carrier however, the salts must be carefully washed out as otherwise difficulty is encountered in impregnating the carrier.

The invention will be described in greater detail in conjunction with the following specific examples:

*Example 1.*—25 liters of potassium silicate solution containing 21.8% $SiO_2$ and 10.5% KOH equivalent are diluted with 35 liters of water and cooled to 0° C. 14 liters of 13% sulfuric acid, likewise cooled to 0° C., are mixed with the silicate solution with stirring. Preferably the stirrer solution should be brought to approximately the temperature of the solutions before the acid is added as otherwise local heating adjacent to the stirrer blade may result in local formation of curds or other undesirable products. The gel rapidly sets which takes as little as a minute or less, and a clear or at most very slightly turbid gel is formed.

On standing, this gel, which originally showed substantially dry surfaces, begins to sweat, shrinks away from the reaction vessel and cracks open. After standing for a number of hours, approximately 42 liters of mother liquor is formed and is poured off. After standing sufficiently to age and partially dry, the gel is broken into suitable fragments and washed. A very firm gel results which after ignition does not shatter when immersed in water. The porosity is extraordinarily high and the gel may be used for any of the ordinary uses of silica gel such as adsorption of vapors, drying of air and similar uses. It may also be used as a very efficient carrier for vanadium catalysts, particularly for use in the contact sulfuric acid process. I do not claim in the present application the production of catalysts, this forming a portion of my copending application Serial No. 6,397 filed Feb. 13, 1935.

*Example 2.*—200 liters of a commercial sodium silicate solution of the usual strength are diluted with 480 liters of water and cooled approximately 0° C. Care should be taken not to go much below 0° C. as there is danger of sodium silicate crystallizing out. 204 liters of 13% sulfuric acid are cooled at 0° C. and stirred into the diluted sodium silicate solution, the whole being maintained at the low temperature. In about 3 minutes the mixture becomes cloudy and at the end of 6 minutes the gel sets.

The gel is treated as described in Example 1 and the final product possesses substantially the same properties.

What I claim is:

1. A method of preparing a silica gel which comprises bringing about reaction between a diluted aqueous alkali metal silicate solution and a mineral acid, the amount of the acid being insufficient to render the reaction mixture acid to Congo, the temperature of reaction being sufficiently below 10° C. to permit formation of a coherent, transparent gel, and the dilution being sufficient to prevent formation of curds or flocks.

2. A method of preparing silica gel which comprises diluting an aqueous alkaline metal silicate solution and bringing about reaction between the silicate solution and an amount of mineral acid insufficient to render the reaction mixture acid to Congo, the temperature of the reaction mixture being maintained at substantially 0° C. and the dilution of the silicate solution being sufficient to prevent formation of the curds or flocks.

3. A method of preparing silica gel which comprises diluting an aqueous potassium silicate solution to a strength corresponding to 5 parts of 33° Bé. potassium silicate to 7 parts of water, cooling the solution to about 0° C. and reacting with an amount of mineral acid insufficient to render the reaction mixture acid to Congo.

4. A method of preparing silica gel which comprises diluting an aqueous sodium silicate solution to a strength corresponding to 5 parts of 33° Bé. sodium silicate to 12 parts of water, cooling the solution to about 0° C. and reacting with an amount of mineral acid insufficient to render the reaction mixture acid to Congo.

5. A method according to claim 3 in which the amount of mineral acid is sufficient to render the reaction mixture substantially neutral to Congo.

6. A method according to claim 4 in which the amount of mineral acid is sufficient to render the reaction mixture substantially neutral to Congo.

EDWARD S. JOHNSON.